United States Patent
Hart et al.

(10) Patent No.: US 11,787,996 B1
(45) Date of Patent: Oct. 17, 2023

(54) WELLBORE CLEANER FOR USE IN DISPLACEMENT TRAINS

(71) Applicant: Halliburton Energy Services, Inc., Houston, TX (US)

(72) Inventors: Emily Hart, Spring, TX (US); Hui Zhou, Houston, TX (US); Kay Ann Galindo, Bryan, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/834,295

(22) Filed: Jun. 7, 2022

(51) Int. Cl.
*C09K 8/52* (2006.01)
*C09K 8/524* (2006.01)
*C09K 23/42* (2022.01)
*C09K 23/38* (2022.01)
*C09K 8/528* (2006.01)

(52) U.S. Cl.
CPC ............ *C09K 8/524* (2013.01); *C09K 8/52* (2013.01); *C09K 8/528* (2013.01); *C09K 23/38* (2022.01); *C09K 23/42* (2022.01)

(58) Field of Classification Search
None
See application file for complete search history.

(56) References Cited

U.S. PATENT DOCUMENTS

| | | | |
|---|---|---|---|
| 8,414,279 B2 | 4/2013 | Kawakami et al. | |
| 8,517,100 B2 | 8/2013 | Ali et al. | |
| 9,163,202 B2 | 10/2015 | De Wit et al. | |
| 9,222,013 B1 | 12/2015 | Champagne et al. | |
| 10,280,360 B2 | 5/2019 | Champagne et al. | |
| 11,091,686 B2 | 8/2021 | Barral et al. | |
| 2007/0265171 A1* | 11/2007 | Javora | C09K 8/524 507/90 |
| 2013/0079255 A1* | 3/2013 | Del Gaudio | C09K 8/524 507/90 |
| 2015/0240142 A1 | 8/2015 | Kefi et al. | |
| 2016/0177169 A1* | 6/2016 | Zhang | C09K 8/52 507/261 |
| 2018/0346789 A1 | 12/2018 | Ali et al. | |

OTHER PUBLICATIONS

Tomadol® Ethoxylated Alcohols; Evonik; Jul. 2017. (Year: 2017).*
Halliburton, Deep Water, BaraXcel™ Drill-In Fluid and BaraKlean®-648 Additive Optimize Deepwater EOR Project, H013290, Jun. 2019. (Year: 2019).*
Halliburton, Deep Water, BaraKlean®-926 Casing Cleaner Delivers Fast, Effective Results, Saving USD 30,000 Per Well in Costs and Rig Time, H013339, Jul. 2019. (Year: 2019).*
Halliburton, Deep Water, BaraXcel™ Drill-In Fluid and BaraKlean®-648 Additive Optimize Deepwater EOR Project, H013290, Jun. 2019.
Halliburton, Deep Water, BaraKlean®-926 Casing Cleaner Delivers Fast, Effective Results, Saving USD 30,000 Per Well in Costs and Rig Time, H013339, Jul. 2019.

* cited by examiner

*Primary Examiner* — Andrew Sue-Ako
(74) *Attorney, Agent, or Firm* — Thomas Rooney; C. Tumey Law Group PLLC

(57) ABSTRACT

A method may include providing a single-phase cleanout fluid comprising a first nonionic surfactant with a hydrophilic-lipophilic balance (HLB) greater than 10, a second nonionic surfactant with an HLB greater than 10, a third nonionic surfactant with an HLB of less than 10, and a solvent; preparing a cleanout pill by mixing the single-phase cleanout fluid with a brine; and displacing a fluid in a wellbore using the cleanout pill.

20 Claims, 3 Drawing Sheets

US 11,787,996 B1

WELLBORE CLEANER FOR USE IN DISPLACEMENT TRAINS

BACKGROUND

The present invention relates to methods and compositions of improving wellbore cleanout treatments.

In wellbore operations, such as well construction and remedial cementing, fluid displacement trains are commonly utilized. A cleanup displacement operation is performed using a series of wellbore servicing fluids which provide both chemical and mechanical cleaning. Fluid displacement trains can include several displacement fluid pills which are specially formulated to remediate formation damage, remove solids, prepare the wellbore surfaces for the next wellbore operation, and other functions. Displacement fluids are often used in subterranean operations to facilitate introduction of incompatible fluids in a wellbore. For example, a displacement fluid can be used to displace a fluid in a wellbore before introduction of another fluid. When used for drilling fluid displacement, displacement fluids can enhance solids removal as well as separate the drilling fluid from a physically incompatible fluid. For instance, in primary cementing operations, the displacement fluid may be placed into the wellbore to separate the cement composition from the drilling fluid. Displacement fluids may also be placed between different drilling fluids during drilling change outs or between a drilling fluid and a completion brine, for example.

To be effective, the displacement fluid can have certain characteristics. For example, the displacement fluid may be compatible with the drilling fluid and the cement composition. This compatibility may also be present at downhole temperatures and pressures. In some instances, it is also desirable for the displacement fluid to leave surfaces in the wellbore water wet, thus facilitating bonding with the cement composition. Rheology of the displacement fluid can also be important. A number of different rheological properties may be important in the design of a displacement fluid, including yield point, plastic viscosity, gel strength, and shear stress, among others.

A particular challenge in designing displacement fluids is that some displacement fluids require multiple incompatible components to be present to be effective. For example, two components can be immiscible thereby requiring that the components be mixed on location immediately before use. In other examples some components of displacement fluids such as D-limonene are highly toxic to marine life.

BRIEF DESCRIPTION OF THE DRAWINGS

These drawings illustrate certain aspects of some of the examples of the present disclosure and should not be used to limit or define the disclosure.

DETAILED DESCRIPTION

Figure 1:
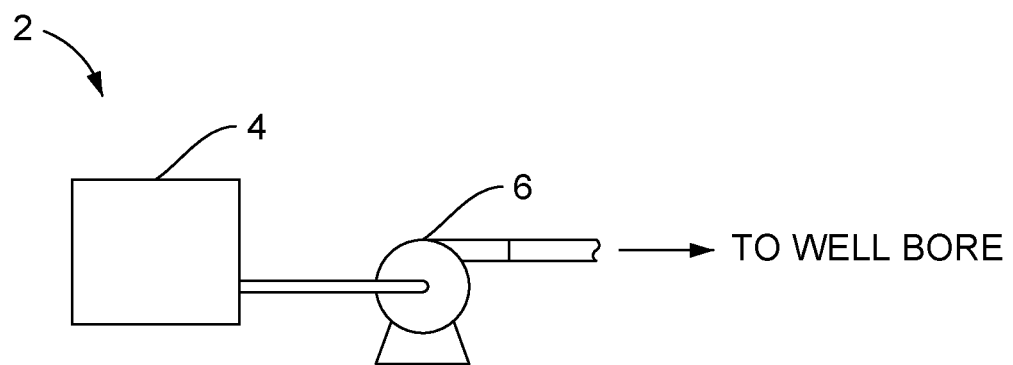
FIG. 1 is a schematic illustration of an example system for the preparation and delivery of a single-phase cleanout fluid into a wellbore in accordance with embodiments of the present disclosure.

The present disclosure may relate to wellbore operations, and in particular, to methods, compositions, and systems utilizing a single-phase cleanout fluid in wellbore fluid displacement. Exemplary a single-phase cleanout fluid of the present disclosure may include a first high hydrophilic-lipophilic balance (HLB) nonionic surfactant, a second high HLB nonionic surfactant, a low HLB nonionic surfactant, a solvent, and a cosolvent. In accordance with at least some examples, the single-phase cleanout fluid may be used to displace a first fluid from a wellbore with the single-phase cleanout fluid generally having a higher yield point than the first fluid. For example, the single-phase cleanout fluid may be used to displace at least a portion of a drilling fluid from the wellbore. Other optional additives may also be included in examples of the single-phase cleanout fluid as desired for a particular application. For example, the single-phase cleanout fluid may further comprise viscosifying agents, polymers, dispersants, surfactants, weighting agents, and any combination thereof.

The nonionic surfactants in the single-phase cleanout fluid may include, but are not limited to, an alcohol alkoxylate such as C9-C11 ethoxylated alcohols, polyethylene-polypropylene glycol mono (2-ethylhexyl) ether, alkylpolyglycoside with alkyl groups with carbon-chain lengths from about 8 and 10, monoglycerides, diglycerides, diacetyl tartaric acid esters of monoglycerides and diglycerides, fatty acid esters produced from fatty acids and sugar alcohols, sorbitan esters, polysorbate 20, polysorbate 40, polysorbate 60, polysorbate 80, ceteareth 20, ethoxylated alcohols, alkyl polyglycoside, and ethylene oxide/propylene oxide copolymers (EO/PO copolymers). Some specific examples of suitable nonionic surfactants may include alkyl polyethylene glycol ether based on branched alcohol and ethylene oxide, for example a C10-branched alcohol, extended surfactants, polysorbate 20, polysorbate 40, polysorbate 60, polysorbate 80, sorbitan monolaurate, sorbitan monostearate, sorbitan monooleate.

Generally, the nonionic surfactant may be included to the single-phase cleanout fluid in any desired concentration, including at a point in a range of from about 0.1% to about 20% by weight of the single-phase cleanout fluid. Alternatively, the nonionic surfactant may be present in the single-phase cleanout fluid from an amount of from about 0.1% to about 1% by weight of the single-phase cleanout fluid, from about 1% to about 2% by weight of the single-phase cleanout fluid, about 2% to about 4% by weight of the single-phase cleanout fluid, from about 4% to about 5% by weight of the single-phase cleanout fluid, from about 5% to about 6% by weight of the single-phase cleanout fluid, from about 6% to about 7% by weight of the single-phase cleanout fluid, from about 7% to about 8% by weight of the single-phase cleanout fluid, at a point in a range of from about 8% to about 9% by weight of the single-phase cleanout fluid, at a point in a range of from about 9% to about 20% by weight of the single-phase cleanout fluid or any ranges therebetween.

The HLB of a surfactant is a measure of the degree to which it is hydrophilic or lipophilic, determined by calculating values for the different regions of the molecule. As used herein, the HLB of a surfactant is characterized by the Davies method based on calculating a value based on chemical groups of the molecule, wherein HLB=7+m*Hh−n*Hl, wherein m is the number of hydrophilic groups in the molecule, Hh is the respective group HLB value of each of the hydrophilic groups, n is the number of lipophilic groups in the molecule, and Hl is the respective group HLB value of each of the lipophilic groups. In some examples, the high HLB nonionic surfactant may be characterized by a Davies HLB in the range of from about 10 to about 18. Alternatively, from about 10 to about 12, about 12 to about 14, about 14 to about 16, about 16 to about 18, or any ranges therebetween. In further examples, the low HLB nonionic surfactant may be characterized by a Davies HLB in the range of from about 3 to about 9. Alternatively, from about 3 to about 5, about 5 to about 7, about 7 to about 9, or any ranges therebetween. In some embodiments, a first nonionic surfactant may have an HLB greater than 10, a second nonionic surfactant may have an HLB greater than 10, and a third nonionic surfactant may have an HLB of less than 10. In some embodiments, a first nonionic surfactant may have an HLB greater than 14 and a second nonionic surfactant may have an HLB greater than 14. In some embodiments, a first nonionic surfactant may have an HLB greater than 17 and a second nonionic surfactant may have an HLB greater than 17. In some embodiments, a third nonionic surfactant may have an HLB of less than 8. In some embodiments, a third nonionic surfactant may have an HLB of less than 6.

The solvent in the single-phase cleanout fluid may include a non-polar base solvent such as linear, cyclic, and branched alkanes, alkenes, alkynes, aromatic, heterocycles, diester oils and combinations thereof with carbon number ranging from 18 and 40 carbon atoms per molecule. Some specific non-polar base solvents may include oleaginous fluids, diesel, kerosene, naphtha, hydrotreated distillate, and combinations thereof. Generally, the solvent may be included to the single-phase cleanout fluid in any desired concentration, including at a point in a range of from about 50% to about 99% by weight of the single-phase cleanout fluid. Alternatively, the solvent may be present in the single-phase cleanout fluid from an amount of about 30% to about 80% by weight of the single-phase cleanout fluid, from about 30% to about 40% by weight of the single-phase cleanout fluid, from about 40% to about 50% by weight of the single-phase cleanout fluid, from about 50% to about 60% by weight of the single-phase cleanout fluid, at a point in a range of from about 60% to about 70% by weight of the single-phase cleanout fluid, at a point in a range of from about 70% to about 80% by weight of the single-phase cleanout fluid or any ranges therebetween.

The solvent in the single-phase cleanout fluid may further include one or more polar co-solvents such as, without limitation, glycols, glycol ethers, lactic acid esters, polyethers, and C6-C14 alcohols, for example. In some examples, polar co-solvents may include ethylene glycol, ethylene glycol monobutyl ether, ethylene glycol monoethyl ether, diethylene glycol monoethyl ether, diethylene glycol, diethylene glycol butyl ether, butyl 3-hydroxybutanoate, polyethylene glycol, propylene glycol, dipropylene glycol, ethers of polypropylene glycol, 2-ethyl hexanol, a glycol, a glycol ether, a glycolate ester, a lactate ester, water, and combinations thereof. Generally, the polar co-solvents may be included to the single-phase cleanout fluid in any desired concentration, including at a point in a range of from about 0.1% to about 60% by weight of the single-phase cleanout fluid. Alternatively, the polar co-solvents may be present in the single-phase cleanout fluid from an amount of about 0.1% to about 1% by weight of the single-phase cleanout fluid, from about 1% to about 5% by weight of the single-phase cleanout fluid, from about 5% to about 10% by weight of the single-phase cleanout fluid, from about 10% to about 15% by weight of the single-phase cleanout fluid, at a point in a range of from about 15% to about 20% by weight of the single-phase cleanout fluid, at a point in a range of from about 20% to about 30% by weight of the single-phase cleanout fluid, at a point in a range of from about 30% to about 40% by weight of the single-phase cleanout fluid, at a point in a range of from about 40% to about 50% by weight of the single-phase cleanout fluid, at a point in a range of from about 50% to about 60% by weight of the single-phase cleanout fluid, or any ranges therebetween.

The water included in the single-phase cleanout fluid may be from any source provided that it does not contain an excess of compounds that may undesirably affect other components in the single-phase cleanout fluid. For example, a single-phase cleanout fluid may include freshwater, saltwater such as brine (e.g., saturated saltwater produced from subterranean formations) or seawater, or any combination thereof. Saltwater generally may include one or more dissolved salts therein and may be saturated or unsaturated as desired for a particular application. Seawater or brines may be suitable for use in some examples of the single-phase cleanout fluid.

The cleanout fluids may be prepared in accordance with any suitable technique. In some examples, the desired quantity of solvent and co-solvent may be introduced into a mixer followed by a blend of the cleanout fluid components. The blend may comprise a single nonionic surfactant single anionic surfactant and additional solid additives such as those described above. Additional liquid additives, if any, may be added to the water as desired prior to, or after, combination with the blend. This mixture may be agitated for a sufficient period of time to form a pumpable slurry. By way of example, pumps may be used for delivery of this pumpable slurry into the wellbore.

In some embodiments, the cleanout fluid may be prepared off location and be delivered by tote or other storage medium to a well site. When used in a displacement operation or as part of a displacement train, a cleanout pill, such as a push will or a wash pill, may be formulated by combining the cleanout fluid with an aqueous brine containing dissolved species therein, and the cleanout pill may be introduced into a wellbore. Any suitable brines may be used including, without limitation, calcium chloride brines, sodium chloride brines, bromide brines, formate brines, and combinations thereof. In some examples, the cleanout pill may be prepared with brine in an amount of about 50% to about 95% by volume of brine in the cleanout pill. Alternatively, the cleanout pill may be prepared with brine in an amount of about 50% to about 60% by volume, about 60% by volume to about 70% by volume, about 70% by volume to about 80% by volume, about 80% by volume to about 90% by volume, about 90% to about 99% by volume, or any ranges therebetween. In some examples, the cleanout fluid may be used directly in a displacement operation or as part of a displacement train without mixing with a brine.

The single-phase cleanout fluid may have a density suitable for a particular application. By way of example, the single-phase cleanout fluid may have a density at a point in a range of from about of from about 4 pounds per gallon ("lb/gal") (479 kg/m$^3$) to about 20 lb/gal (2396 kg/m$^3$). Alternatively, the single-phase cleanout fluid may have a density at a point in a range of from about 4 lb/gal (479 kg/m$^3$) to about 7 lb/gal (839 kg/m$^3$), at a point in a range of from about 7 lb/gal (839 kg/m$^3$) to about 10 lb/gal (1198 kg/m$^3$), at a point in a range of from about 10 lb/gal (1198 kg/m$^3$) to about 13 lb/gal (1558 kg/m$^3$), at a point in a range of from about 13 lb/gal (1558 kg/m$^3$), to about 16 lb/gal, at a point in a range of from about 16 lb/gal to about 20 lb/gal, or any points therebetween. The density of single-phase cleanout fluid may be a design factor as the density range of cement may be limited by the formation properties. One method to control density may be to increase the fraction of water included in the single-phase cleanout fluid. However, increasing water fraction may lead to a stratification of the single-phase cleanout fluid whereby free water may separate from the bulk single-phase cleanout fluid. One of the potential advantages of the single-phase cleanout fluid of the present application is emulsion stability across a range of densities.

In some examples, the cleanout fluid is included as part of a displacement operation or displacement train. A cleanup displacement operation is performed using a series of wellbore servicing fluids—namely "pills," "spacers," or both—which provide both chemical and mechanical cleaning actions. When circulated through the wellbore in a defined sequence, this collection of fluids is commonly known as a displacement train. A displacement operation typically includes displacing an initial fluid disposed in a wellbore, such as an oil-based mud. A base oil pill may be introduced into the wellbore to thin the oil-based mud and partially solvate the oil-based mud. A second pill, sometimes referred to as a push pill, is introduced into the wellbore after the base oil pill where the push pill provides physical cleaning in the wellbore. Push pills can optionally contain solid particles to enhance mud removal. Push pills also provide separation between the base oil pill and subsequently introduced pills. After the push pill, a wash pill may be introduced into the wellbore. A wash pill typically contains chemical cleaners which remove mud from the wellbore and may include surfactants, solvents, flocculants, and other chemical cleaners. A sweep pill may optionally be introduced after the wash pill to transport solids in the wellbore to the surface. A final fluid may then be introduced into the wellbore, such as a cementing spacer fluid. As will be discussed herein, the single-phase cleanout fluid can be included as or as a component of a push will and/or a wash pill.

In some embodiments, the single-phase cleanout fluid may be prepared off location and be delivered by tote or other storage medium to a well site. A cleanout pill may be formulated by combining the single-phase cleanout fluid with a brine and the cleanout pill may be introduced into a wellbore. In some examples, the cleanout pill may be prepared with brine in an amount of about 50% to about 95% by weight. Alternatively, the cleanout pill may be prepared with brine in an amount of about 50% to about 60% by weight, about 60% by weight to about 70% by weight, about 70% by weight to about 80% by weight, about 80% by weight to about 90% by weight, about 90% to about 99% by weight, or any ranges therebetween.

An example method may include a method of displacing a first fluid from a wellbore, the wellbore penetrating a subterranean formation. The method may include providing a single-phase cleanout fluid that comprise a single anionic surfactant, a single nonionic surfactant, and a solvent. One or more additives may also be included in the single-phase cleanout fluid as discussed herein. The method may further comprise introducing the single-phase cleanout fluid into the wellbore to displace at least a portion of the first fluid from the wellbore. In some examples, the single-phase cleanout fluid may displace the first fluid from a wellbore annulus, such as the annulus between a pipe string and the subterranean formation or between the pipe string and a larger conduit. In some examples, the first fluid displaced by the single-phase cleanout fluid includes a drilling fluid. By way of example, the single-phase cleanout fluid may be used to displace the drilling fluid from the wellbore. In addition to displacement of the drilling fluid from the wellbore, the single-phase cleanout fluid may also remove the drilling fluid from the walls of the wellbore. Additional steps in examples of the method may comprise introducing a pipe string into the wellbore, introducing a cement composition into the wellbore with the single-phase cleanout fluid separating the cement composition and the first fluid. In an embodiment, the cement composition may be allowed to set in the wellbore. The cement composition may include, for example, cement and water.

Another example method may include using a single-phase cleanout fluid comprising a single anionic surfactant, a single nonionic surfactant, and a solvent to displace a drilling fluid in a wellbore. One or more additives may also be included in the single-phase cleanout fluid as discussed herein. The method may further include introducing a cement composition into the wellbore after the single-phase cleanout fluid, wherein the single-phase cleanout fluid separates the cement composition from the drilling fluid. Any of the examples of a single-phase cleanout fluid described herein may apply in the context of this example method.

Accordingly, the present disclosure may provide methods, systems, and apparatus that may relate to displacement fluids. The methods, systems, and apparatus may include any of the various features disclosed herein, including one or more of the following statements.

Statement 1. A method comprising: providing a single-phase cleanout fluid comprising a first nonionic surfactant with a hydrophilic-lipophilic balance (HLB) greater than 10, a second nonionic surfactant with an HLB greater than 10, a third nonionic surfactant with an HLB of less than 10, and a solvent; preparing a cleanout pill by mixing the single-phase cleanout fluid with a brine; and displacing a fluid in a wellbore using the cleanout pill.

Statement 2. The method of statement 1 wherein the first nonionic surfactant and/or the second nonionic surfactant have an HLB greater than 14.

Statement 3. The method of any of statements 1-2 wherein the first nonionic surfactant and/or the second nonionic surfactant have an HLB greater than 17.

Statement 4. The method of any of statements 1-3 wherein the third nonionic surfactant has an HLB less than 8.

Statement 5. The method of any of statements 1~4 wherein the third nonionic surfactant has an HLB less than 6.

Statement 6. The method of any of statements 1-5 wherein the first nonionic surfactant and the second nonionic surfactant comprises at least one surfactant selected from the group consisting of a C9-C11 ethoxylated alcohol, polyethylene-polypropylene glycol mono (2-ethylhexyl) ether, alkylpolyglycoside with alkyl groups with carbon-chain lengths from about 8 and 10, monoglycerides, a diglyceride, a diacetyl tartaric acid ester of monoglycerides and diglycerides, polysorbate 20, polysorbate 40, polysorbate 60, polysorbate 80, ceteareth 20, an ethoxylated alcohol, alkyl polyglycoside, and an ethylene oxide/propylene oxide copolymer (EO/PO copolymer).

Statement 7. The method of any of statements 1-6 wherein either the first nonionic surfactant or the second nonionic surfactant comprises an alkyl polyethylene glycol ether based on a branched alcohol and ethylene oxide.

Statement 8. The method of statement 7 wherein the alkyl polyethylene glycol ether is based on a C10—branched alcohol and ethylene oxide.

Statement 9. The method of any of statements 1-8 wherein either the first nonionic surfactant or the second nonionic surfactant comprises polysorbate.

Statement 10. The method of statement 9 wherein the first nonionic surfactant and the second nonionic surfactant are present in an amount of about 5% to about 10% by weight of the single-phase cleanout fluid.

Statement 11. The method of any of statements 1-10 wherein the third nonionic surfactant comprises a sorbitan ester.

Statement 12. The method of statement 11 wherein the third nonionic surfactant is present in an amount of about 0.5% to about 1.5% by weight of the single-phase cleanout fluid.

Statement 13. The method of any of statements 1-12 wherein either the first nonionic surfactant, the second nonionic surfactant, or the third nonionic surfactant are present in an amount of about 0.1% to about 10% by weight of the single-phase cleanout fluid.

Statement 14. The method of any of statements 1-13 wherein the single-phase cleanout fluid further comprises at least one polar co-solvent selected from the group consisting of a glycol, a glycol ether, a lactic acid ester, a polyether, and a C6-C14 alcohol.

Statement 15. The method of any of statements 1-14 wherein the single-phase cleanout fluid further comprises at least one polar co-solvent selected from the group consisting of ethylene glycol, ethylene glycol monobutyl ether, ethylene glycol monoethyl ether, diethylene glycol monoethyl ether, diethylene glycol, diethylene glycol butyl ether, butyl 3-hydroxybutanoate, polyethylene glycol, propylene glycol, dipropylene glycol, ethers of polypropylene glycol, 2-ethyl hexanol, a glycol, a glycol ether, a glycolate ester, a lactate ester, water, and combinations thereof.

Statement 16. The method of any of statements 1-15 wherein the brine comprises at least one brine selected from the group consisting of $CaCl_2$, NaBr, $CaBr_2$, and combinations thereof and wherein the cleanout pill comprises the brine in an amount of about 50% to about 95% by weight.

Statement 17. A method comprising: providing a single-phase cleanout fluid comprising an oleaginous fluid, ethylene glycol monobutyl ether, polysorbate 80, ethoxylated alcohol, sorbitan oleate, butyl 3-hydroxybutanoate, 2-ethyl hexanol, and ethylene glycol; preparing a cleanout pill by mixing the single-phase cleanout fluid with a brine; and displacing a fluid in a wellbore using the cleanout pill.

Statement 18. The method of statement 17 wherein the oleaginous fluid is present in an amount of about 50% to about 60% by weight of the single-phase cleanout fluid, wherein the ethylene glycol monobutyl ether is present in an amount of about 12% to about 16% by weight of the single-phase cleanout fluid, wherein the polysorbate 80 is present in an amount of about 6% to about 8% by weight of the single-phase cleanout fluid, wherein the ethoxylated alcohol is present in an amount of about 6% to about 8% by weight of the single-phase cleanout fluid, wherein the sorbitan oleate is present in an amount of about 0.5% to about 1.5% by weight of the single-phase cleanout fluid, wherein the butyl 3-hydroxybutanoate is present in an amount of about 10% to about 15% by weight of the single-phase cleanout fluid, wherein the 2-ethyl hexanol is present in an amount of about 3% to about 5% by weight of the single-phase cleanout fluid, and wherein the ethylene glycol is present in an amount of about 0.5% to about 1.5% by weight of the single-phase cleanout fluid.

Statement 19. The method of any of statements 17-18 wherein the brine comprises at least one brine selected from the group consisting of $CaCl_2$, NaBr, $CaBr_2$, and combinations thereof.

Statement 20. The method of any of statements 17-19 wherein the cleanout pill comprises the brine in an amount of about 50% to about 95% by weight.

Example methods of using the displacing fluids in wellbore operations will now be described in more detail with reference to FIGS. 1-4. FIG. 1 illustrates an example system 2 for preparation of a single-phase cleanout fluid and delivery of the single-phase cleanout fluid to a wellbore. As shown, the single-phase cleanout fluid may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix a dry blend comprising components of the single-phase cleanout fluid described herein, for example, with solvent as it is being pumped to the wellbore. Any of the embodiments of a single-phase cleanout fluid described herein may apply in the context of FIGS. 1-4.

Figure 2:
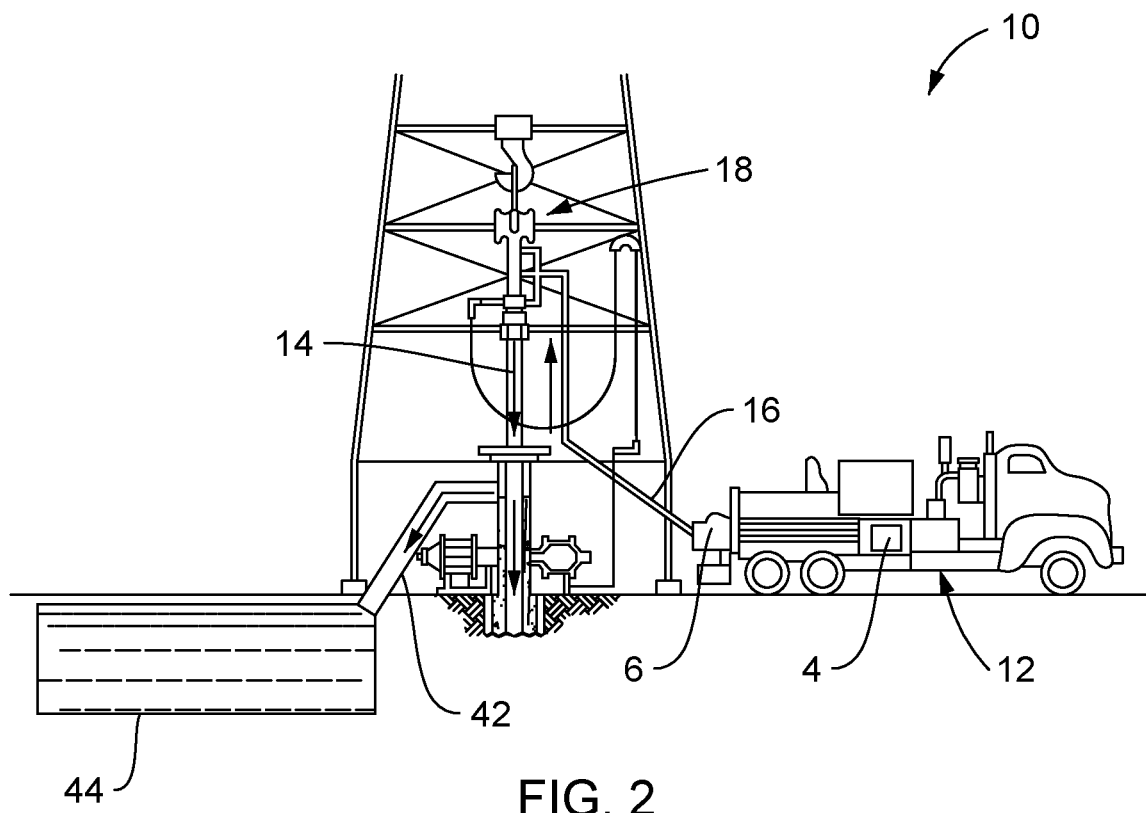
FIG. 2 is a schematic illustration of example surface equipment that may be used in the placement of a single-phase cleanout fluid into a wellbore in accordance with embodiments of the present disclosure.

FIG. 2 illustrates example surface equipment 10 that may be used in placement of a single-phase cleanout fluid and/or cement composition. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include mixing equipment 4 and pumping equipment 6 as will be apparent to those of ordinary skill in the art. The cementing unit 12 may pump a single-phase cleanout fluid and/or cement composition in the direction indicated by arrows 14 through a feed pipe 16 and to a cementing head 18 which conveys the fluid downhole. Any of the embodiments of a single-phase cleanout fluid described herein may apply in the context of FIG. 2 with respect to the single-phase cleanout fluid.

Figure 3:
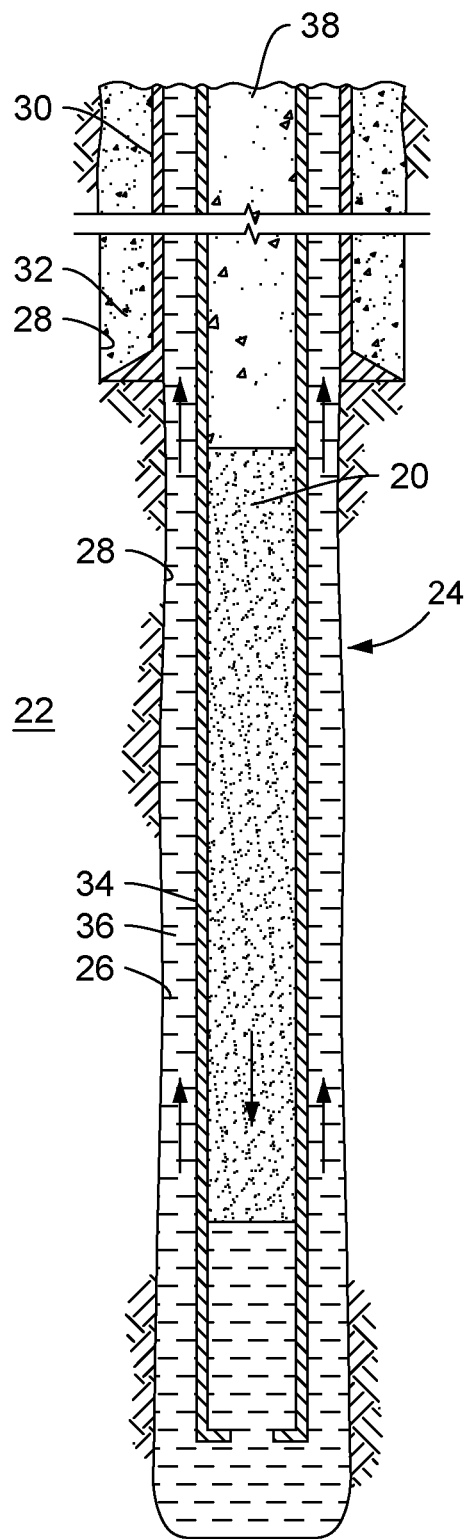
FIG. 3 is a schematic illustration of an example in which a single-phase cleanout fluid is used to displace a drilling fluid in accordance with embodiments of the present disclosure.

An example of using a single-phase cleanout fluid 20 will now be described with reference to FIG. 3. Any of the embodiments of a single-phase cleanout fluid described herein may apply in the context of FIG. 3 with respect to the single-phase cleanout fluid 20. FIG. 3 depicts one or more subterranean formations 22 penetrated by a wellbore 24 with drilling fluid 26 disposed therein. The drilling fluid 26 may include the example drilling fluids disclosed herein as well as other suitable drilling fluids that will be readily apparent to those of ordinary skill in the art. While the wellbore 24 is shown extending generally vertically into the one or more subterranean formations 22, the principles described herein are also applicable to wellbores that extend at an angle through the one or more subterranean formations 22, such as horizontal and slanted wellbores. As illustrated, the wellbore 24 comprises walls 28. In the illustrated embodiment, a surface casing 30 has been cemented to the walls 28 of the wellbore 24 by cement sheath 32. In the illustrated embodiment, one or more additional pipe strings (e.g., intermediate casing, production casing, liners, etc.), shown here as casing 34 may also be disposed in the wellbore 24. As illustrated, there is a wellbore annulus 36 formed between the casing 34 and the walls 28 of the wellbore 24 (and/or the surface casing 30). While not shown, one or more centralizers may be attached to the surface casing 30, for example, to centralize the casing 34 in the wellbore 24 prior to and during the cementing operation.

As illustrated, a cement composition 38 may be introduced into the wellbore 24. For example, the cement composition 38 may be pumped down the interior of the casing 34. The pump 6 shown on FIGS. 1 and 2 may be used for delivery of the cement composition 38 into the wellbore 24. It may be desired to circulate the cement composition 38 in the wellbore 24 until it is in the wellbore annulus 36. The cement composition 38 may include the example cement compositions disclosed herein as well as other suitable cement compositions that will be readily apparent to those of ordinary skill in the art. While not illustrated, other techniques may also be utilized for introduction of the cement composition 38. By way of example, reverse circulation techniques may be used that include introducing the cement composition 38 into the wellbore 24 by way of the wellbore annulus 36 instead of through the casing 34.

The single-phase cleanout fluid 20 may be used to separate the drilling fluid 26 from the cement composition 38. The previous embodiments described with reference to FIG. 1 for preparation of a single-phase cleanout fluid may be used for delivery of the single-phase cleanout fluid 20 into the wellbore 24. Moreover, the pump 6 shown on FIGS. 1 and 2 may also be used for delivery of the single-phase cleanout fluid 20 into the wellbore 24. The single-phase cleanout fluid 20 may be used with the cement composition 38 for displacement of the drilling fluid 26 from the wellbore 24 as well as preparing the wellbore 24 for the cement composition 38. By way of example, the single-phase cleanout fluid 20 may function, inter alia, to remove the drilling fluid 26, drilling fluid 26 that is dehydrated/gelled, and/or filter cake solids from the wellbore 24 in advance of the cement composition 38. While not shown, one or more plugs or other suitable devices may be used to physically separate the drilling fluid 26 from the single-phase cleanout fluid 20 and/or the single-phase cleanout fluid 20 from the cement composition 38.

Figure 4:
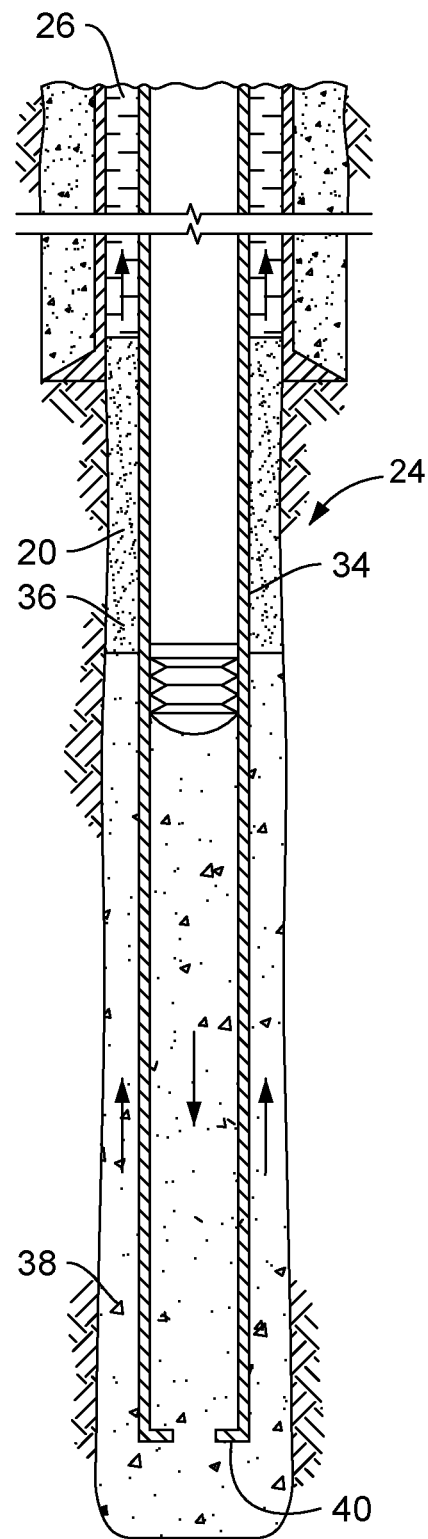
FIG. 4 is a schematic illustration of an example in which a single-phase cleanout fluid is used in a wellbore operation in accordance with embodiments of the present disclosure.

Referring now to FIG. 4, the drilling fluid 26 has been displaced from the wellbore annulus 36 in accordance with certain embodiments. As illustrated, the single-phase cleanout fluid 20 and the cement composition 38 may be allowed to flow down the interior of the casing 34 through the bottom of the casing 34 (e.g., casing shoe 40) and up around the casing 34 into the wellbore annulus 36, thus displacing the drilling fluid 26. At least a portion of the displaced drilling fluid 26 may exit the wellbore annulus 36 via a flow line 42 and be deposited, for example, in one or more retention pits 44 (e.g., a mud pit), as shown in FIG. 2. Turning back to FIG. 4, the cement composition 38 may continue to be circulated until it has reached a desired location in the wellbore annulus 36. The single-phase cleanout fluid 20 and/or the cement composition 38 may be left in the wellbore annulus 36. As illustrated, the single-phase cleanout fluid 20 may be disposed in the wellbore annulus 36 above or on top of the cement composition 38. The cement composition 38 may set in the wellbore annulus 36 to form an annular sheath of hardened, substantially impermeable material (i.e., a cement sheath) that may support and position the casing 34 in the wellbore 24. As previously mentioned, embodiments of the single-phase cleanout fluid 20 may consolidate in the wellbore annulus 36. Thus, the single-phase cleanout fluid 20 may help to stabilize the casing 34 while also serving to provide a barrier to protect the portion of the casing 34 from corrosive effects of water and/or water-based drilling fluids that would otherwise remain in the wellbore annulus 36 above the cement composition 38.

The exemplary single-phase cleanout fluid disclosed herein may directly or indirectly affect one or more components or pieces of equipment associated with the preparation, delivery, recapture, recycling, reuse, and/or disposal of the cement compositions and associated cement compositions. For example, the cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the agglomerated zeolite catalyst, or fluids containing the same, into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions such as, but not limited to, wellbore casings, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, terrorizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present disclosure, the following examples of some embodiments are given. In no way should such examples be read to limit, or to define, the scope of the disclosure.

Example 1

In this example, a mud removal test was performed to evaluate the percent mud removal of the displacement fluid of the present application. A gravimetric analysis was utilized whereby a specialized closed-end Fann® 35 rheometer sleeve is weighed (M1) and is immersed in a beaker of oil-based drilling mud at a specified temperature and 100 RPM rotation. The mud-coated sleeve is then weighed (M2) and immersed in a series of wash pills, followed by a water rinse. The final mass of the cleaned sleeve (M3) and the initial mass of the clean sleeve (M1) are then used to calculate percent mud removal with the following equation:

$$\% \text{ Mud Removal} = \frac{M2 - M3}{M2 - M1} * 100$$

Figure 5:
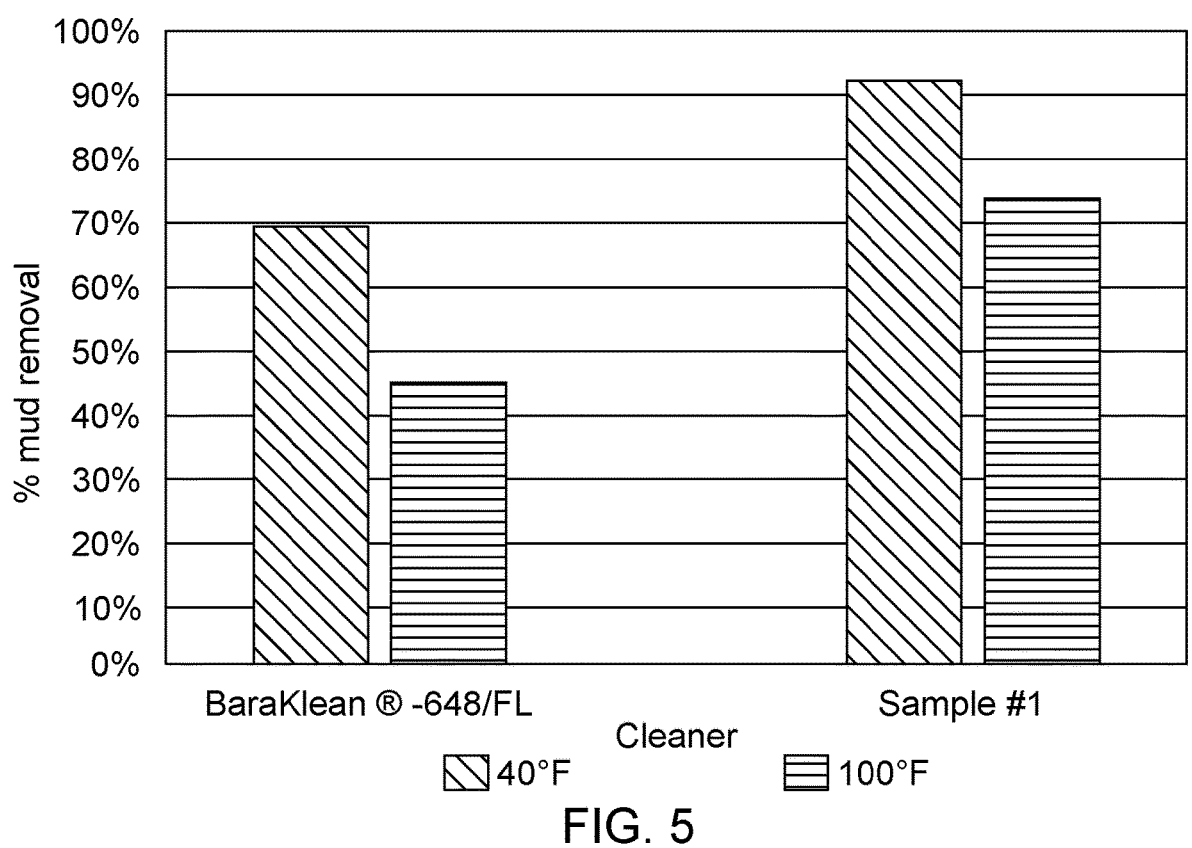
FIG. 5 is a graph of results of a mud removal experiment using a single-phase cleanout fluid.

Wash pills were prepared by mixing 20% cleaner and 80% 13.0 pounds per gallon (ppg) (1557 kg/m³) CaCl₂/CaBr₂ brine (v/v). A benchmark wash pill was prepared using a combination of 15% BaraKlean®-648 and 5% BaraKlean®-FL, both commercially available cleaners available from Halliburton Energy Services, Inc. A microemulsion cleaner was prepared according to Table 1 and a test wash pill was mixed using the microemulsion cleaner. The ethoxylated alcohol was alkyl polyethylene glycol ether based on C10-branched alcohol and ethylene oxide. The mud used was BaraXcel™ oil-based drilling fluid, a commercially available drilling mud available from Halliburton Energy Services, Inc. Each wash pill was prepared and tested at 40° F. (4.4° C.) and 100° (37.7° C.). The results of the mud removal test are shown in FIG. 5. It was observed that the performance of the single-phase cleanout fluid from Table 1 was better than the commercially available cleaner. It was further observed that foam formation, wettability, cleaner miscibility, and brine compatibility were comparable between the microemulsion cleanout fluid and commercially available cleaner.

TABLE 1

| Compound | % (w/w) | Role |
| --- | --- | --- |
| Hydrotreated Light Distillate | 51.09 | Non-polar solvent |
| Ethylene glycol monobutyl ether | 14.25 | Polar co-solvent |
| Polysorbate 80 | 7.66 | High HLB nonionic surfactant |
| Ethoxylated alcohol | 7.66 | High HLB nonionic surfactant |
| Sorbitan oleate | 0.86 | Low HLB nonionic surfactant |
| Butyl 3-hydroxy butanoate | 13.10 | Polar co-solvent |
| 2-ethyl hexanol | 4.31 | Polar co-solvent |
| Ethylene glycol | 1.07 | Polar co-solvent |

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The examples disclosed above are illustrative only, as the present embodiments may be modified and practiced in different but equivalent manners apparent to those skilled in the art and having the benefit of the teachings herein. Although individual examples are discussed, the present disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method comprising:
   providing a single-phase cleanout fluid comprising a first nonionic surfactant with a hydrophilic-lipophilic balance (HLB) greater than 10, a second nonionic surfactant with an HLB greater than 10, a third nonionic surfactant with an HLB of less than 10, and a solvent, wherein the single-phase cleanout fluid is substantially free of water;
   preparing a cleanout pill by introducing the single-phase cleanout fluid and a brine into a mixer and mixing the single-phase cleanout fluid with the brine to form the cleanout pill, wherein the cleanout fluid is prepared off location and delivered by storage medium to a well site;
   pumping the cleanout pill into a wellbore; and
   displacing a fluid in the wellbore using the cleanout pill.

2. The method of claim 1 wherein the first nonionic surfactant and/or the second nonionic surfactant have an HLB greater than 14.

3. The method of claim 1 wherein the first nonionic surfactant and/or the second nonionic surfactant have an HLB greater than 17.

4. The method of claim 1 wherein the third nonionic surfactant has an HLB less than 8.

5. The method of claim 1 wherein the third nonionic surfactant has an HLB less than 6.

6. The method of claim 1 wherein the first nonionic surfactant and the second nonionic surfactant comprises at least one surfactant selected from the group consisting of a C9-C11 ethoxylated alcohol, polyethylene-polypropylene glycol mono (2-ethylhexyl) ether, alkylpolyglycoside with alkyl groups with carbon-chain lengths from about 8 and 10, monoglycerides, a diglyceride, a diacetyl tartaric acid ester of monoglycerides and diglycerides, polysorbate 20, polysorbate 40, polysorbate 60, polysorbate 80, ceteareth 20, an ethoxylated alcohol, alkyl polyglycoside, and an ethylene oxide/propylene oxide copolymer (EO/PO copolymer).

7. The method of claim 1 wherein either the first nonionic surfactant or the second nonionic surfactant comprises an alkyl polyethylene glycol ether based on a branched alcohol and ethylene oxide.

8. The method of claim 7 wherein the alkyl polyethylene glycol ether is based on a C10-branched alcohol and ethylene oxide.

9. The method of claim 1 wherein either the first nonionic surfactant or the second nonionic surfactant comprises polysorbate.

10. The method of claim 9 wherein the first nonionic surfactant and the second nonionic surfactant are present in an amount of about 5% to about 10% by weight of the single-phase cleanout fluid.

11. The method of claim 1 wherein the third nonionic surfactant comprises a sorbitan ester.

12. The method of claim 11 wherein the third nonionic surfactant is present in an amount of about 0.5% to about 1.5% by weight of the single-phase cleanout fluid.

13. The method of claim 1 wherein either the first nonionic surfactant, the second nonionic surfactant, or the third nonionic surfactant are present in an amount of about 0.1% to about 10% by weight of the single-phase cleanout fluid.

14. The method of claim 1 wherein the single-phase cleanout fluid further comprises at least one polar co-solvent selected from the group consisting of a glycol, a glycol ether, a lactic acid ester, a polyether, and a C6-C14 alcohol.

15. The method of claim 1 wherein the single-phase cleanout fluid further comprises at least one polar co-solvent selected from the group consisting of ethylene glycol, ethylene glycol monobutyl ether, ethylene glycol monoethyl ether, diethylene glycol monoethyl ether, diethylene glycol, diethylene glycol butyl ether, butyl 3-hydroxybutanoate, polyethylene glycol, propylene glycol, dipropylene glycol, ethers of polypropylene glycol, 2-ethyl hexanol, a glycol, a glycol ether, a glycolate ester, a lactate ester, and combinations thereof.

16. The method of claim 1 wherein the brine comprises at least one brine selected from the group consisting of $CaCl_2$, NaBr, $CaBr_2$, and combinations thereof and wherein the cleanout pill comprises the brine in an amount of about 50% to about 95% by weight.

17. A method comprising:
providing a single-phase cleanout fluid comprising an oleaginous fluid, ethylene glycol monobutyl ether, polysorbate 80, ethoxylated alcohol, sorbitan oleate, butyl 3-hydroxybutanoate, 2-ethyl hexanol, and ethylene glycol;
preparing a cleanout pill by mixing the single-phase cleanout fluid with a brine; and
displacing a fluid in a wellbore using the cleanout pill.

18. The method of claim 17 wherein the oleaginous fluid is present in an amount of about 50% to about 60% by weight of the single-phase cleanout fluid, wherein the ethylene glycol monobutyl ether is present in an amount of about 12% to about 16% by weight of the single-phase cleanout fluid, wherein the polysorbate 80 is present in an amount of about 6% to about 8% by weight of the single-phase cleanout fluid, wherein the ethoxylated alcohol is present in an amount of about 6% to about 8% by weight of the single-phase cleanout fluid, wherein the sorbitan oleate is present in an amount of about 0.5% to about 1.5% by weight of the single-phase cleanout fluid, wherein the butyl 3-hydroxybutanoate is present in an amount of about 10% to about 15% by weight of the single-phase cleanout fluid, wherein the 2-ethyl hexanol is present in an amount of about 3% to about 5% by weight of the single-phase cleanout fluid, and wherein the ethylene glycol is present in an amount of about 0.5% to about 1.5% by weight of the single-phase cleanout fluid.

19. The method of claim 17 wherein the brine comprises at least one brine selected from the group consisting of $CaCl_2$, NaBr, $CaBr_2$, and combinations thereof.

20. The method of claim 17 wherein the cleanout pill comprises the brine in an amount of about 50% to about 95% by weight.

* * * * *